United States Patent [19]

Srivastava

[11] Patent Number: 5,291,295
[45] Date of Patent: Mar. 1, 1994

[54] SYSTEM FOR EQUALIZING PHOSPHOR AGING IN CRT, SUBJECT TO DIFFERENT ASPECT RATIO DISPLAYS BY OPERATING UNUSED DISPLAY PORTIONS AT BRIGHTNESS LEVELS DETERMINED BY THE BRIGHTNESS LEVELS OF CORRESPONDING ADJACENT SIMILAR SIZED DISPLAY PORTIONS

[75] Inventor: Gopal K. Srivastava, Arlington Heights, Ill.

[73] Assignee: Zenith Electronics Corp., Glenview, Ill.

[21] Appl. No.: 931,173

[22] Filed: Aug. 17, 1992

[51] Int. Cl.⁵ ............................................... H04N 5/46
[52] U.S. Cl. ................................... 348/805; 348/555; 348/687; 348/913
[58] Field of Search ............... 358/242, 140, 64, 11, 358/168, 183, 141, 142; 340/814; H04N 5/46, 5/57, 5/59, 5/262, 5/272

[56] References Cited

U.S. PATENT DOCUMENTS

| | | | |
|---|---|---|---|
| 4,670,784 | 6/1987 | Goldberg | 358/242 |
| 5,068,728 | 11/1987 | Macovski | 358/11 |
| 5,193,006 | 3/1993 | Yamazaki | 358/242 |

FOREIGN PATENT DOCUMENTS

| | | | |
|---|---|---|---|
| 0090788 | 3/1990 | Japan | H04N 5/46 |
| 01-04072 | 4/1990 | Japan | H04N 5/46 |
| 0149190 | 6/1990 | Japan | H04N 5/46 |
| 0301272 | 12/1990 | Japan | H04N 5/46 |
| 4082386 | 3/1992 | Japan | H04N 5/46 |

Primary Examiner—James J. Groody
Assistant Examiner—Chris Grant

[57] ABSTRACT

A brightness management arrangement for equalizing the aging of the phosphor screen of a 16:9 aspect ratio cathode ray tube used for 4:3 aspect ratio video displays provides low level illumination of the unused portions of the phosphor screen when displaying 4:3 aspect ratio video. The unused end panels are divided into three sections with the illumination level of each section being determined by the illumination levels of adjacent areas of the 4:3 video display.

3 Claims, 2 Drawing Sheets

SYSTEM FOR EQUALIZING PHOSPHOR AGING IN CRT, SUBJECT TO DIFFERENT ASPECT RATIO DISPLAYS BY OPERATING UNUSED DISPLAY PORTIONS AT BRIGHTNESS LEVELS DETERMINED BY THE BRIGHTNESS LEVELS OF CORRESPONDING ADJACENT SIMILAR SIZED DISPLAY PORTIONS

BACKGROUND OF THE INVENTION AND PRIOR ART

This invention relates to multi format display systems for cathode ray tubes (CRTs). A conventional CRT display has an aspect ratio (AR), i.e. the ratio of its horizontal and vertical dimensions, of 4:3. Recently proposed high definition television systems include CRTs having 16:9 aspect ratios to provide displays that are more like those used in the movies. A difficulty arises in that the phosphor screen of a 16:9 aspect ratio CRT is only partially illuminated when displaying a 4:3 AR video signal. A number of uses for the unused portions of the CRT have been proposed. U.S. Pat. No. 5,159,438, entitled, ASPECT RATIO CONVERSION OF TELEVISION DISPLAY, in the name of K. Rabii and assigned to Zenith Electronics Corporation, discloses a technique for converting a 4:3 AR video signal to a 16:9 format to permit use of the entire CRT surface. Some proposals simply cover the so-called "side panels," or unilluminated portions of the CRT that result, with a movable curtain or mask.

The present invention is directed to an anticipated problem in multi format display systems due to phosphor aging of the CRT screen. All phosphors are subject to aging (browning), i.e. their light output diminishes with use. A 16:9 AR CRT that is also used for displaying 4:3 AR video will have significant portions of its phosphor display surface that are not activated in the 4:3 display mode. Thus portions of the CRT phosphor screen will experience different levels of usage. After some period of operation, the phosphor surface that experiences less use will be brighter (for the same beam current) than the phosphor surface that is used more often. The result will be a difference in brightness across the face of the CRT, which could prove most distracting when viewing a high definition television display.

The present invention minimizes the possibility of such an eventuality by providing low level illumination for the unused portions of the CRT phosphor screen when operating with 4:3 AR video displays.

OBJECTS OF THE INVENTION

A principal object of the invention is to provide an improved 16:9 AR CRT display system.

Another object of the invention is to provide a CRT brightness management system that minimizes differential aging of the CRT phosphor screen.

A further object of the invention is to extend the useful life of a CRT used with multi aspect ratio displays.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
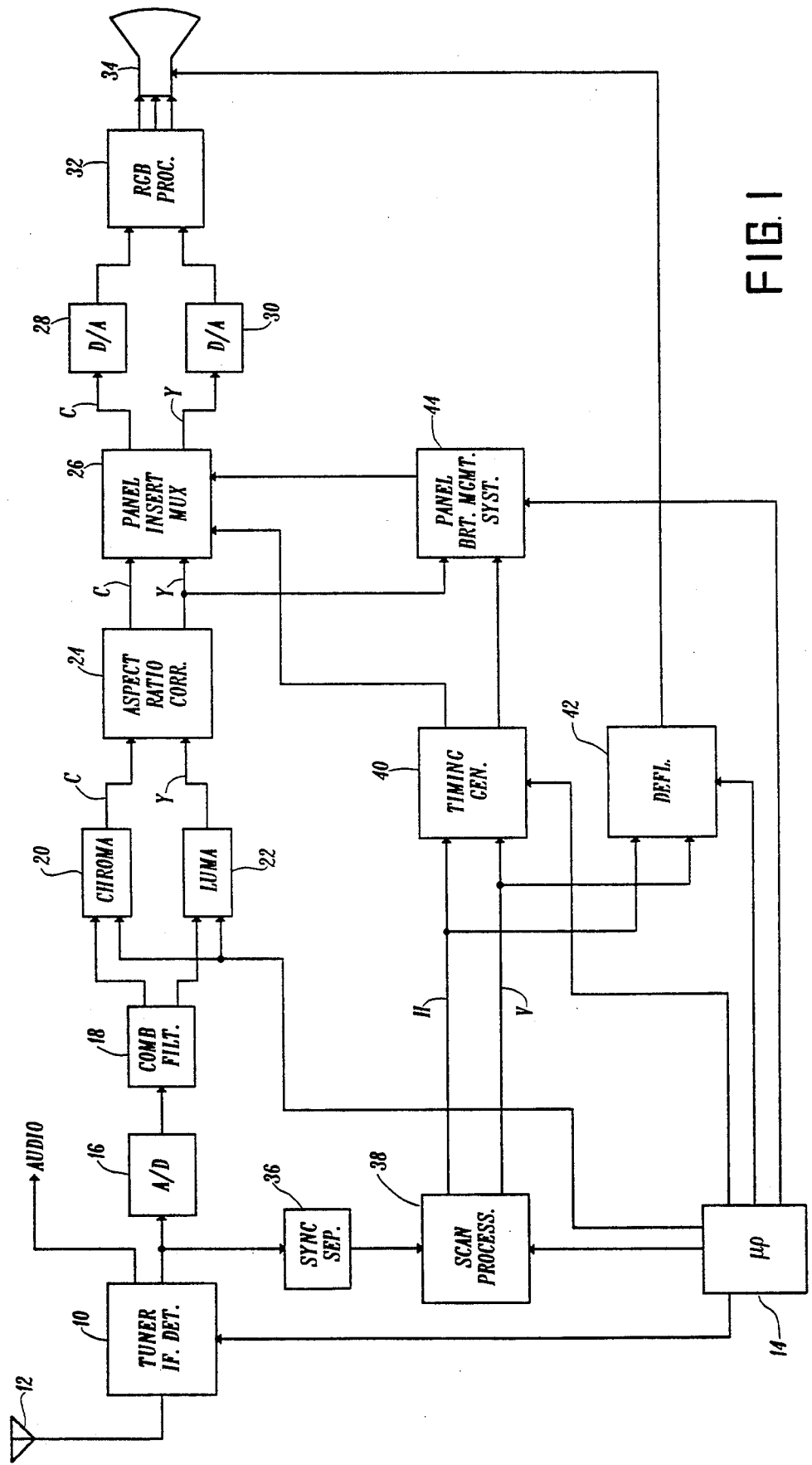
FIG. 1 is a simplified block diagram of a television receiver having a CRT brightness management system constructed in accordance with the invention.

Referring to FIG. 1, a tuner, IF and detector circuit 10 is coupled to a source of television signals via an antenna 12, although cable signals or VCR signals may also be used. Tuner circuit 10 is controlled by a microprocessor 14 and develops a video output that is supplied to an analog-to-digital (A/D) converter 16 and to a sync separator 36, and an audio output that is applied to well known audio processing circuitry (not illustrated). A/D 16 converts the analog information to digital form and supplies a comb filter 18 which separates the chroma (C) and the luma (Y) and supplies an appropriate output to a chroma amplifier 20 and to a luma amplifier 22. The output (C) of chroma amplifier 20 is applied along with the output (Y) of luma amplifier 22 to an aspect ratio corrector 24, which configures the AR of the video information to reduce the CRT display surface in a horizontal direction so that the geometry of the display is restored to the original aspect ratio. The chroma and luma outputs of aspect ratio corrector 24 are supplied to a panel insert multiplexer 26 which, in turn, supplies C and Y outputs to digital-to-analog (D/A) converters 28 and 30. The D/A converter outputs are applied to a red, blue and green (RGB) processing circuit 32, the outputs of which are used to drive a 16:9 aspect ratio CRT 34.

The output of sync separator 36 is applied to a scan processor 38 where the horizontal (H) and vertical (V) sync signals are recovered and applied to a timing generator 40 and to a deflection circuit 42. The output of deflection circuit 42 is used to control deflection of the CRT electron beams across the phosphor screen of CRT 34, all in a conventional manner. The timing generator 40 provides timing signal outputs to panel insert multiplexer 26 and to a panel brightness management system 44 which also receives the luma information Y from aspect ratio corrector 24. The brightness management system 44 is coupled to panel insert multiplexer 26. Microprocessor 14 is coupled to: scan processor 38; chroma amplifier 20; luma amplifier 22; timing generator 40; deflection system 42; and brightness management system 44 and controls the operation of these circuits.

Figure 2:
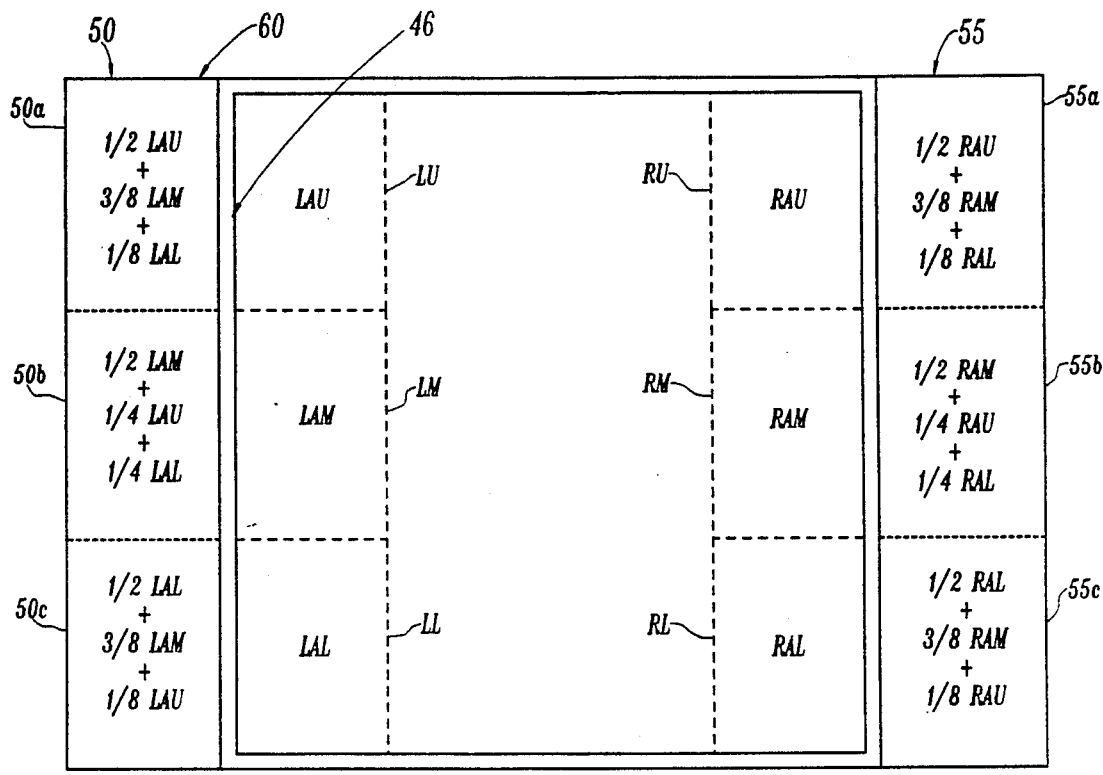
FIG. 2 illustrates a 4:3 AR and 16:9 AR CRT with a preferred form of the brightness management system of the invention.

In FIG. 2, a 16:9 aspect ratio CRT phosphor display surface is indicated by the solid line rectangle 60. A 4:3 aspect ratio display surface is superimposed thereon and is illustrated by the double line rectangle 46. Two end panels, a left side end panel 50 and a right side end panel 55 result because the 4:3 AR display is smaller than the 16:9 display. In the preferred embodiment, the end panels flank the 4:3 AR display and are each divided into three sections with left end panel 50 being divided into an upper section 50a, a middle section 50b and a lower section 50c. Right end panel 55 is similarly divided into an upper section 55a, a middle section 55b and a lower section 55c. These sections are illustrated by the dotted lines. The dashed lines adjacent the edges of the 4:3 aspect ratio display 46 indicate illuminated (used) sections of the 4:3 AR display that correspond to the unused end panel portions. Thus, the left section is divided into LU, LM and LL for left upper, left middle and left lower, respectively, and the right section is divided into RU, RM and RL for right upper, right middle and right lower, respectively. The section areas are labelled LAU, LAM and LAL and RAU, RAM and RAL, respectively, and represent the average brightness or picture levels of the video display in the corresponding sections. The level LAU therefore represents the average picture level brightness in section LU of the 4:3 AR display 46. Similarly, RAL represents the average brightness level of the portion RL of the 4:3 AR display 46.

As indicated on the end panels, the upper section 50a of end panel 50 has a brightness that is determined by the equation ½ LAU+¼ LAM+¼ LAL. Thus, ½ of its brightness is determined by the brightness of section LU, ¼ is determined by the brightness of section LM and ¼ is determined by the average brightness of the video in section LL. Similarly, section 50b of end panel 50 has its brightness determined by ½ of the brightness of section LM and ¼ each of the sections LU and LL. Finally, lower section 50c has its brightness determined by ½ of the brightness of section LL, ¼ of the brightness of section LM and ¼ of the brightness of section LU. A similar arrangement is used for the right end panel 55. It will be noted that, in practice, a factor is used to reduce the end panel brightness to a low grey level with the determined brightness levels providing adjustments thereto to more nearly follow the brightness of the adjacent video.

Thus the result of displaying a 4:3 aspect ratio picture on a 16:9 aspect ratio CRT using the illustrated embodiment of the invention is that the end panels 50 and 55 of the 16:9 AR CRT 60 are illuminated at levels which are related to the average brightness levels of the edges of the 4:3 AR video display. While the contemplated illumination level is significantly lower than the corresponding brightness levels of the adjacent edges of the 4:3 aspect ratio display 46, they are of sufficient intensity to assure that the phosphor surface of the 16:9 AR CRT is activated so that browning of the phosphors is "normalized" over the entire surface area of the CRT.

It will be recognized that, while the brightness levels of the particular arrangement disclosed are presently preferred, other brightness levels may be utilized with equal facility. As a general rule, the receiver should maximize the usage of the end panels created by the 4:3 AR display for displaying information such as picture-in-picture, menu selection and the like. It is also contemplated that the end panels be illuminated during channel changes and the like to further help minimize any differential browning of the end panel phosphor screen.

Figure 3:
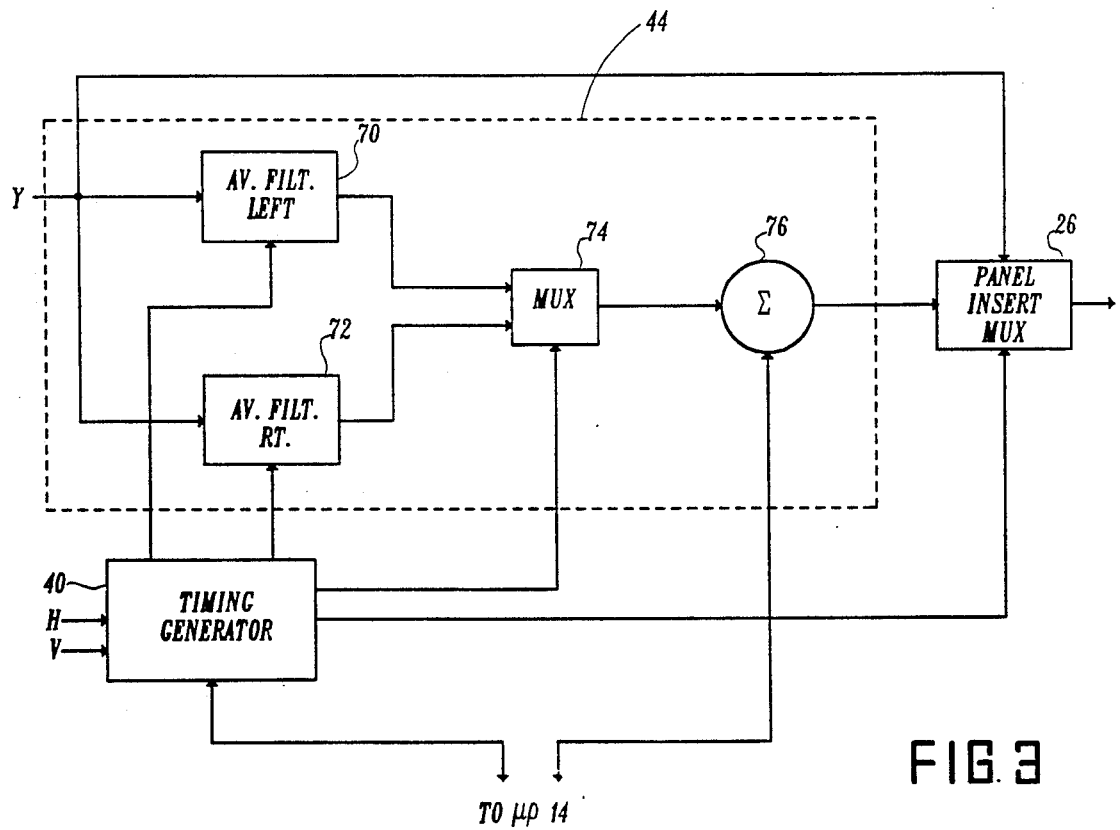
FIG. 3 is a block diagram of the brightness management system of FIG. 1.

In FIG. 3, a block diagram of a brightness management apparatus for implementing the invention is shown. The brightness management system 44 is indicated by the dashed line and includes an average filter 70 for the left end panel of the CRT display area and an average filter circuit 72 for the right end panel. These average filters 70 and 72 are controlled by timing generator 40 and their outputs are applied to a multiplexer 74 which is also under control of timing generator 40. The output of multiplexer 74 is supplied to an adder 76 which, in turn, is supplied with a base brightness level control signal determined by microprocessor 14 to set a nominal low grey brightness level of the end panels. This insures that the end panels are illuminated sufficiently to normalize aging but are not objectionably bright. The output of summer 76 is applied to panel insert multiplexer 26 along with the luma input Y from aspect ratio corrector 24 (FIG. 1). It will be noted that the chroma signal path is not displayed in FIG. 3 as it is not involved in the brightness management system 44.

What has been described is a novel arrangement for equalizing any phosphor browning of the display screen of a 16:9 aspect ratio CRT that is also used for 4:3 aspect ratio pictures. It is recognized that numerous changes in the described embodiment of the invention will be apparent to those skilled in the art without departing from its true spirit and scope. The invention is to be limited only as defined in the claims.

What is claimed is:

1. A television receiver, including a cathode ray tube with a phosphor screen for displaying video signals with aspect ratios of 16:9 and 4:3, one of which results in unused portions of said phosphor screen, comprising:
   video processing means coupled to said cathode ray tube;
   means for supplying said video signals to said video processing means;
   means for determining the brightness levels of adjacent portions of said phosphor screen close to said unused portions of said phosphor screen;
   means for establishing a brightness level for said unused portions as a function of the brightness levels determined for said adjacent portions; and
   means for illuminating said unused portions at said established brightness levels of said phosphor screen during reception of video signals with said ones aspect ratio, said adjacent portions comprising three sections on each side of said phosphor screen and said brightness levels of said unused portions being determined by combining the brightness levels of said three sections.

2. The television receiver of claim 1 further including aspect ratio correction means for fully utilizing one dimension of said phosphor screen irrespective of the aspect ratio of the video signal being received.

3. A television receiver, including a 16:9 aspect ratio cathode ray tube, that also displays video signals of 4:3 aspect ratio, comprising:
   video processing means or supplying signals for display on said cathode ray tube;
   said cathode ray tube having a phosphor screen that includes unused end panel portions when 4:3 aspect ratio video signals are displayed thereon;
   means for determining the brightness levels of said displayed video signals in corresponding portions adjacent to said unused end panel portions, said adjacent portions being substantially equal in said to said unused end panel portions; and
   means for illuminating said unused end panel portions as a function of said determined brightness levels for said adjacent portions.

* * * * *

UNITED STATES PATENT AND TRADEMARK OFFICE
CERTIFICATE OF CORRECTION

PATENT NO. : 5,291,295

DATED : Mar. 1, 1994

INVENTOR(S) : Gopal K. Srivastava

It is certified that error appears in the above-identified patent and that said Letters Patent is hereby corrected as shown below:

Column 4,
In claim 1 line 38, cancel "ones" and substitute therefor --one--; and In claim 3 line 58, cancel "said" and substitute therefor --size--.

Signed and Sealed this

Twenty-seventh Day of February, 1996

Attest:

BRUCE LEHMAN

*Attesting Officer*      *Commissioner of Patents and Trademarks*